US012276153B2

(12) United States Patent
Schneider et al.

(10) Patent No.: US 12,276,153 B2
(45) Date of Patent: Apr. 15, 2025

(54) MULTI-JOINT HINGE

(71) Applicant: Hettich-ONI GmbH & Co. KG, Vlotho (DE)

(72) Inventors: Mark Schneider, Porta Westfalica (DE); Ralf Tofall, Bueckeburg (DE)

(73) Assignee: Hettich-ONI GmbH & Co. KG, Vlotho (DE)

( * ) Notice: Subject to any disclaimer, the term of this patent is extended or adjusted under 35 U.S.C. 154(b) by 110 days.

(21) Appl. No.: 18/029,154

(22) PCT Filed: Sep. 6, 2021

(86) PCT No.: PCT/EP2021/074489
§ 371 (c)(1),
(2) Date: Mar. 29, 2023

(87) PCT Pub. No.: WO2022/069158
PCT Pub. Date: Apr. 7, 2022

(65) Prior Publication Data
US 2023/0383584 A1 Nov. 30, 2023

(30) Foreign Application Priority Data
Sep. 30, 2020 (DE) ..................... 10 2020 125 605.1

(51) Int. Cl.
*E05D 3/06* (2006.01)
*E05F 1/12* (2006.01)
(Continued)

(52) U.S. Cl.
CPC .............. *E05F 3/20* (2013.01); *E05F 1/1253* (2013.01); *E05F 3/18* (2013.01); *E05F 5/02* (2013.01);
(Continued)

(58) Field of Classification Search
CPC .. E05F 3/20; E05F 1/1253; E05F 5/02; F25D 23/028; F25D 2323/024
See application file for complete search history.

(56) References Cited

U.S. PATENT DOCUMENTS 5,058,238 A * 10/1991 Lautenschlager ......... E05D 3/16 16/370
8,225,459 B2 * 7/2012 Waltemate ............ E05F 1/1261 16/371
(Continued)

FOREIGN PATENT DOCUMENTS

AT 516 587 A1 6/2016
DE 202006013358 U1 * 2/2008 ............... E05D 3/06
(Continued)

OTHER PUBLICATIONS

International Search Report in PCT/EP2021/074489, mailed Dec. 7, 2021.
(Continued)

*Primary Examiner* — Chuck Y Mah
(74) *Attorney, Agent, or Firm* — Collard & Roe, P.C.

(57) ABSTRACT

A multi-joint hinge has a mounting element which can be fixed to an appliance body and a hinge part which can be fixed to a door and which is held pivotably on the mounting element via a joint mechanism with a plurality of joint levers. The hinge part is biased in the closing direction via a spring and at least one linear damper with a damper housing and a piston rod displaceable relative to the damper housing is provided which brakes a closing movement of the hinge part. The linear damper is arranged with the damper housing in a rotationally fixed manner via a holding element within a lever and the holding element is fixed to a lever of the joint mechanism. The piston rod can be pushed into the
(Continued)

Figure 1A:
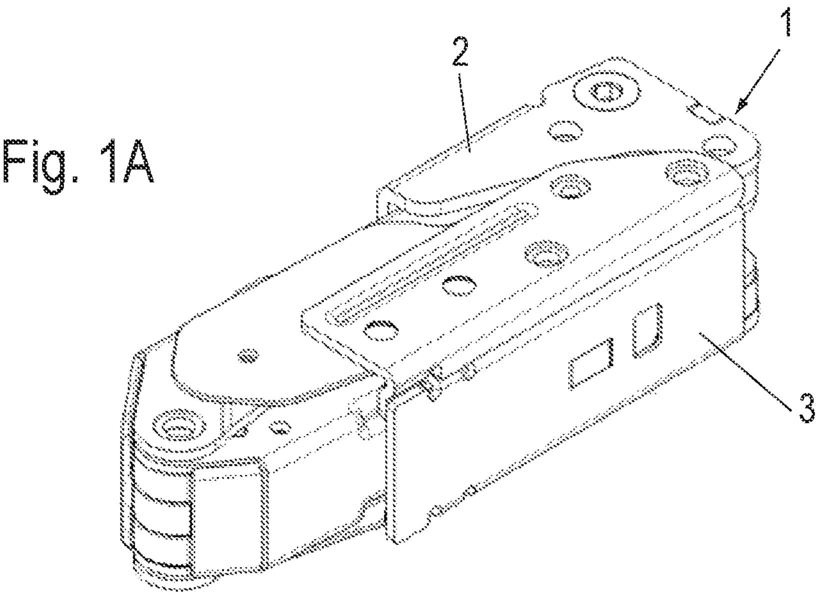

damper housing via an actuating element which is arranged on a further lever of the joint mechanism.

20 Claims, 8 Drawing Sheets

(51) Int. Cl.

| | |
|---|---|
| ***E05F 3/18*** | (2006.01) |
| ***E05F 3/20*** | (2006.01) |
| ***E05F 5/02*** | (2006.01) |
| ***F25D 23/02*** | (2006.01) |

(52) U.S. Cl.
CPC ........ *F25D 23/028* (2013.01); *E05Y 2900/31* (2013.01); *F25D 2323/024* (2013.01)

(56) References Cited

U.S. PATENT DOCUMENTS

| | | | | |
|---|---|---|---|---|
| 9,695,621 | B2 * | 7/2017 | Walhorn | E05F 3/104 |
| 10,221,597 | B2 * | 3/2019 | Hammerer | E05F 5/006 |
| 10,370,884 | B2 * | 8/2019 | Stuke | E05F 1/1008 |
| 11,021,901 | B2 * | 6/2021 | Thielmann | E05D 11/0054 |
| 11,377,891 | B2 * | 7/2022 | Salice | E05F 5/006 |
| 11,414,908 | B2 * | 8/2022 | Salice | E05F 5/006 |
| 2008/0168620 | A1 * | 7/2008 | Hammerle | E05F 5/006 16/85 |
| 2010/0101052 | A1 * | 4/2010 | Waltemate | E05F 5/02 16/297 |
| 2015/0330128 | A1 * | 11/2015 | Ng | E05D 3/16 16/65 |
| 2016/0153224 | A1 * | 6/2016 | Salice | E05D 3/16 16/65 |
| 2017/0138106 | A1 * | 5/2017 | Stuke | E05F 1/14 |
| 2018/0087307 | A1 * | 3/2018 | Hammerer | E05F 5/006 |
| 2020/0131830 | A1 * | 4/2020 | Byun | E05D 11/0054 |
| 2021/0010311 | A1 * | 1/2021 | Nordieker | E05F 1/1261 |
| 2022/0034577 | A1 * | 2/2022 | Oh | F25D 23/028 |

FOREIGN PATENT DOCUMENTS

| | | | | |
|---|---|---|---|---|
| DE | 202007004621 | U1 * | 9/2008 | E05D 3/06 |
| DE | 202016102909 | U1 * | 7/2016 | E05D 3/16 |
| WO | 2008/119647 | A1 | 10/2008 | |
| WO | WO-2016090391 | A1 * | 6/2016 | E05D 11/1021 |
| WO | WO-2016201461 | A1 * | 12/2016 | E05D 11/1021 |
| WO | 2018/104199 | A1 | 6/2018 | |
| WO | WO-2019242942 | A1 * | 12/2019 | E05D 3/16 |

OTHER PUBLICATIONS

German Search Report dated Jun. 7, 2021 in German Application No. 10 2020 125 605.1 with English translation of relevant parts.

* cited by examiner

MULTI-JOINT HINGE

CROSS REFERENCE TO RELATED APPLICATIONS

This application is the National Stage of PCT/EP2021/074489 filed on Sep. 6, 2021, which claims priority under 35 U.S.C. § 119 of German Application No. 10 2020 125 605.1 filed on Sep. 30, 2020, the disclosure of which is incorporated by reference. The international application under PCT article 21(2) was not published in English.

The present invention relates to a multi-joint hinge, in particular for a refrigerator, having a mounting element which can be fixed to a body and a hinge part which can be fixed to a door and is held pivotably on the mounting element between a closed position and a maximum open position via a joint mechanism having a plurality of joint levers, wherein the hinge part is biased in the closing direction in a contraction range via a spring and at least one linear damper is provided with a damper housing and a piston rod which is displaceable relative to the damper housing and which brakes a closing movement of the hinge part before the closing position is reached.

WO 2008/119647 discloses a multi-joint hinge in which a hinge member is pivotably supported on a mounting member, wherein a spring is provided within the levers of the hinge mechanism for retracting a door fixable to the hinge member into the closed position. In order to brake the movement of the hinge part into the closed position, a linear damper is also provided, which comprises a damper housing and a displaceable piston rod. The linear damper is rotatably mounted here and thus requires additional installation space due to the pivoting movement. An elongated hole is formed on one of the levers in order to move the linear damper only when the hinge part is located just before the closed position. These multi-joint hinges have proven themselves, however, it may be necessary to optimise the required installation space of the hinge, especially for heavy door weights such as those used in refrigerators.

In WO 2018/104199 it is proposed to provide a damper arrangement with two parallel linear dampers in a multi-joint hinge. The two linear dampers are fixed to the damper housing via an eyelet on one side, and the piston rod is connected to an eyelet on the opposite side, so that compressive and tensile forces can be exerted on the linear dampers. The linear damper is also rotatably mounted and thus takes up additional installation space due to the pivoting movement. The manufacture and assembly of these dampers is comparatively complex and, in addition, the linear dampers are very long in their construction length and are coupled to the levers of the hinge mechanism over the entire swivel range of the hinge part. This means that additional installation space is required.

It is therefore an object of the present invention to create a multi-joint hinge which has improved damping during a closing movement of the hinge part and has a low installation space requirement.

This object is achieved with a multi-joint hinge with the features of claim 1. Advantageous embodiments result from the subclaims.

In the multi-joint hinge according to the invention, at least one linear damper comprising a damper housing and a displaceable piston rod is arranged with the damper housing in a rotationally fixed manner via a holding element within a lever and the holding element is fixed to a lever of the joint mechanism and the piston rod can be pushed into the damper housing via an actuating element, the actuating element being arranged on a further lever of the joint mechanism. This facilitates assembly, as the damper housing is inserted into the receptacle on the holding element and there is no need to attach an eyelet in connection with the multi-joint hinge. Via the receptacle, the damper housing can be positioned with a predetermined orientation within the multi-joint hinge to then generate damping forces during a closing movement of the hinge part. This achieves a compact design with the holding element positioned within the lever. The lever may be U-shaped or L-shaped in cross-section, so that the holding element is received in a groove-shaped or angular channel in the lever. Preferably, the lever is U-shaped in cross-section and the damper housing of the at least one linear damper is arranged between the two legs of the lever.

Preferably, the actuating element has an arcuate contour on which the piston rods can slide indirectly or directly with one end face. The actuating element is designed here as a pin, for example a cylindrical pin, which is fixed between two walls of the further lever of the joint mechanism.

At least one piston rod of the linear damper can move on the actuating element and is preferably aligned perpendicular to the longitudinal direction of the piston rods. Two or more piston rods of the linear damper can also move simultaneously or offset to each other at the actuating element. If the linear dampers are offset, a particularly gentle damping curve can be realised. The actuating element can be designed as a cylindrical pin or with a different cross-sectional shape. In this case, the actuating element on the further lever can act on the piston rods in a damping range when the hinge part is pivoted and can be moved freely in a range outside the damping range. In this case, a part of the swivel range of the hinge part is designed as a freewheel in which no damping forces act. This is achieved by the actuating element being arranged in the area of the freewheel at a distance from the piston rods and not contacting them. This freewheel is independent of any spring forces.

Alternatively, the actuating element may be adjustable, in particular slidably attached to the further lever, thus allowing the range of the freewheel to be adjusted with respect to the damping forces.

In a preferred embodiment, the holding element is fixed to a hinge axis between the lever and the further lever. Alternatively, the holding element can also be fixed to one of the levers of the hinge. In this way, the installation space within the multi-joint hinge can be optimally used for the linear dampers. For a stable support of the holding element, the holding element can have a stop that is supported on a wall of the lever.

Preferably, a stop element is provided on each receptacle, which limits a movement of a damper housing when the piston rod is pushed in and supports it on the side opposite the piston rod. The stop element can be designed, for example, as a stop pin that is fixed to two walls of the lever and engages through the holding element. In this way, even high forces can be absorbed by the stop element when the piston rod is pushed in, which is fixed to the walls of the lever at opposite ends. The holding element can, for example, consist of or comprise moulded bodies made of plastic. The stop element can be designed as a metallic pin and is thus designed to absorb higher forces. Optionally, an adjustment mechanism can be integrated on the damper housing, with the help of which a linear adjustment of the damper housing or the piston rod and consequently an adjustment of the damping power is made possible.

Preferably, the spring of the multi-joint hinge acts on a guide lever or a slider that can be moved along a curve guide when the hinge part is pivoted. Thus, a contraction range of the spring can be defined via the curve guide, which preferably lies between the closed position of the hinge part and an opening angle of the hinge part between 20° to 40°. The effective range of the linear dampers, i.e. the damping range, is preferably smaller than the contraction range of the spring in relation to the swivel range of the hinge part, so that no unintentional stopping of the door in an opening range is caused. The two linear dampers can be effective, for example, between a closed position of the hinge part and an open position of the hinge part between 10° to 25°, in particular 15° to 20°. The effective range can begin when damping forces are generated via the linear damper after overcoming a possible idle stroke.

Each linear damper preferably has a spring element that biases the piston rod into a projecting position. This allows the actuating element for compressing the linear damper to stress and compress it exclusively by pressure, while the piston rod of the linear damper is automatically moved into the extended position during an opening movement of the hinge part.

The multi-joint hinge is preferably designed as a seven-joint hinge with four levers that can be pivoted relative to each other, forming a total of seven joints. Alternatively, the multi-joint hinge can also be designed as a four-joint hinge. Preferably, at least one lever of the joint mechanism is designed as a U-shaped bent sheet steel part and can bear high weight loads.

In a preferred embodiment, at least two linear dampers are provided, whereby the piston rods can be pushed together into the damper housing via the actuating element at least in a partial range between the closed position of the hinge part and an open position of the hinge part. The use of two dampers arranged in parallel on the multi-joint hinge also enables braking of heavy door weights, for example on refrigerator doors.

The actuating element on the further lever preferably acts on the at least one piston rod when the hinge part is pivoted in a damping range and can be moved freely in a range outside the damping range. The actuating element is thus arranged in the area of free movement at a distance from the at least one piston rod. This means that the linear damper does not have to be fixed on opposite sides.

In a further embodiment of the invention, the actuating element comprises an inlet guide for the at least one piston rod. The inlet guide can be funnel-shaped in order to provide lateral guidance towards the actuating element when the piston rod enters the inlet guide. The inlet guide for the at least one piston rod can allow a small lateral play and receive the piston rod with play, preferably with a lateral play of less than 1 mm.

The actuating element is preferably designed to be adjustable relative to the linear damper so that a contact point between the at least one piston rod and the actuating element can be adjusted depending on the angular position of the hinge part. This allows the damping range to be adjusted.

The multi-hinged hinge is preferably used in a refrigerator with an appliance body and a door pivotably mounted on the appliance body.

Figure 1B:
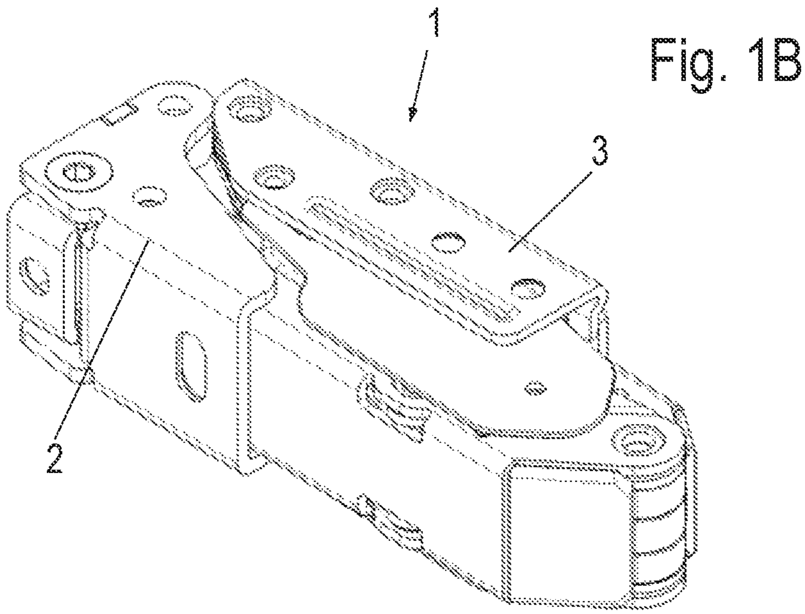
Figure 2:
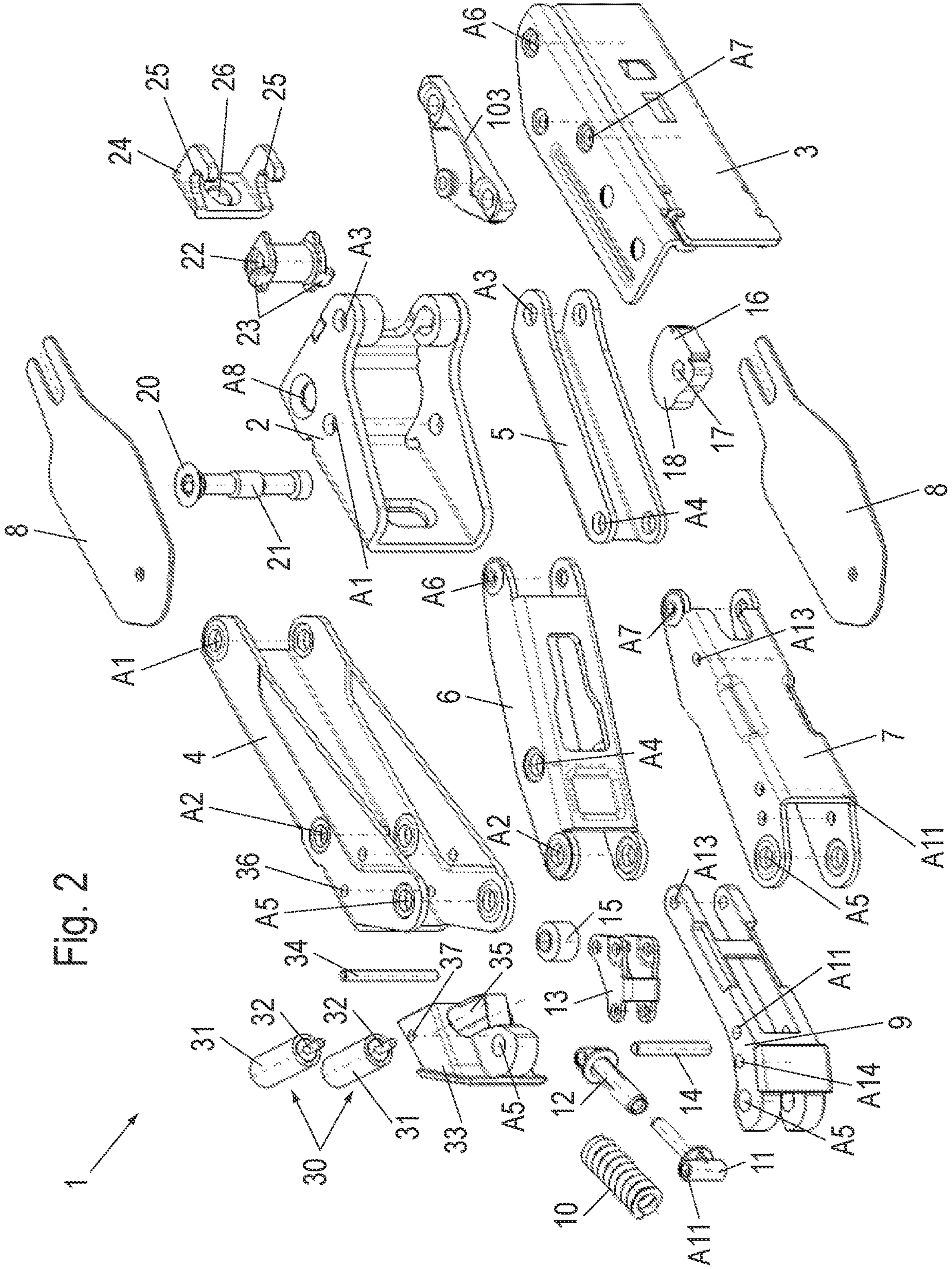
Figure 4A:
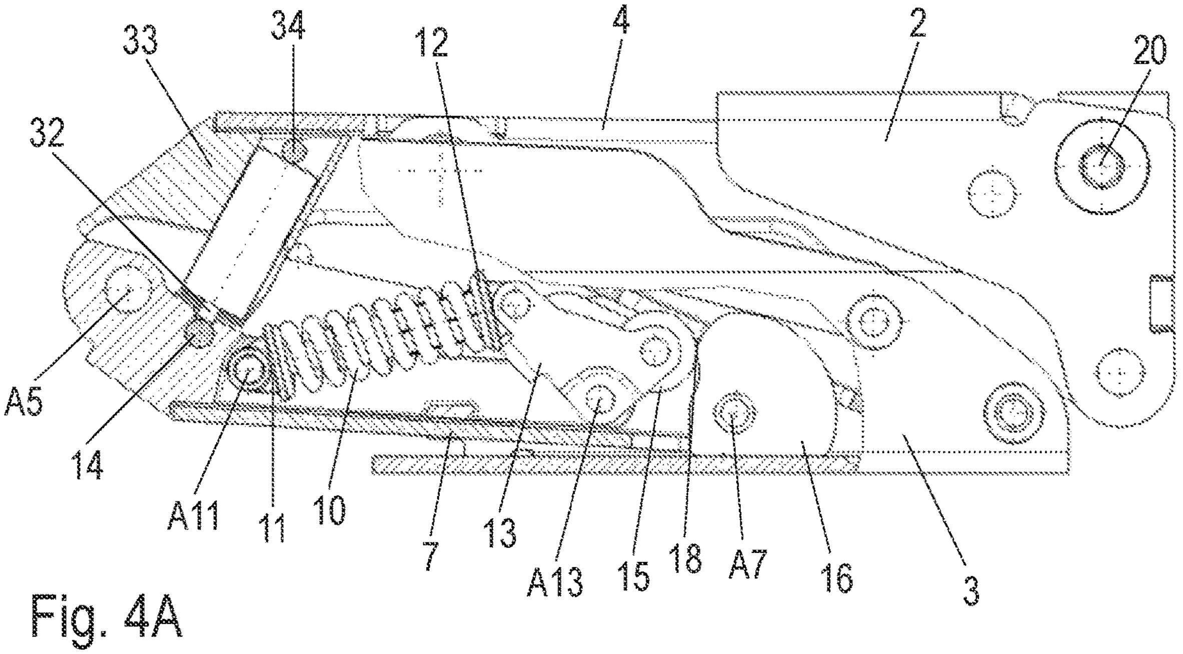
Figure 4B:
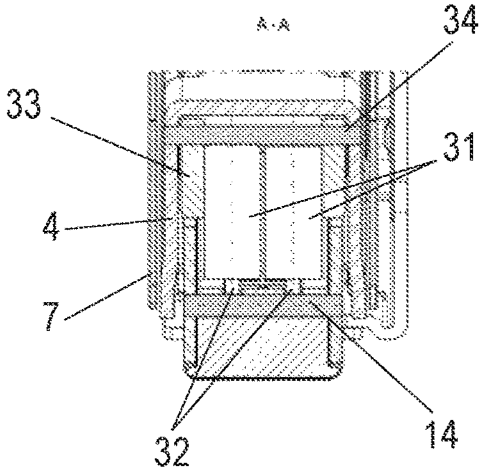
Figure 5B:
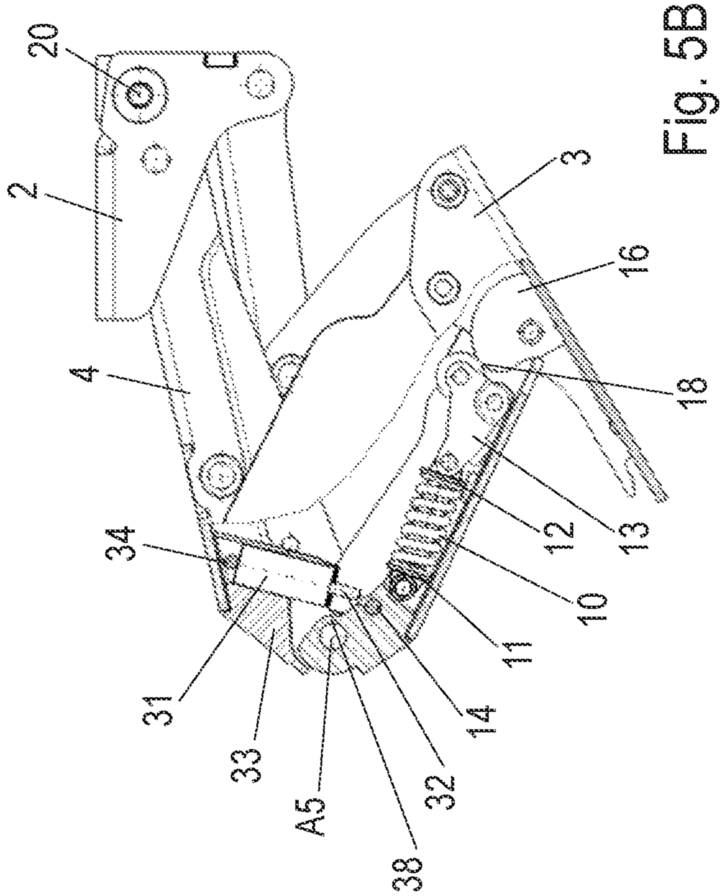
Figure 5A:
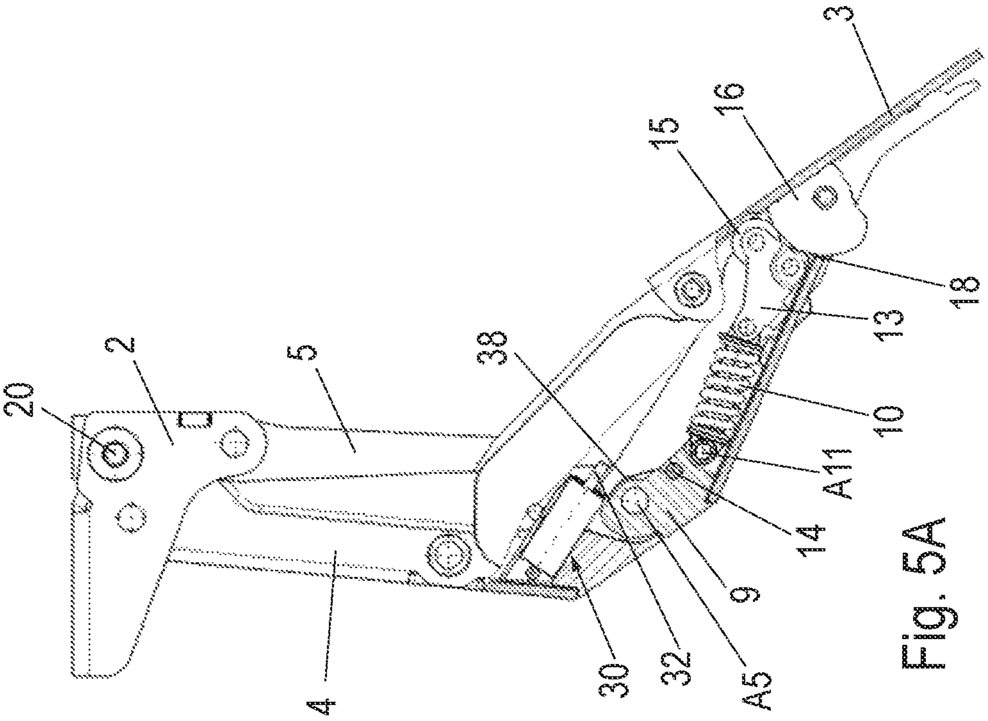
Figure 5D:
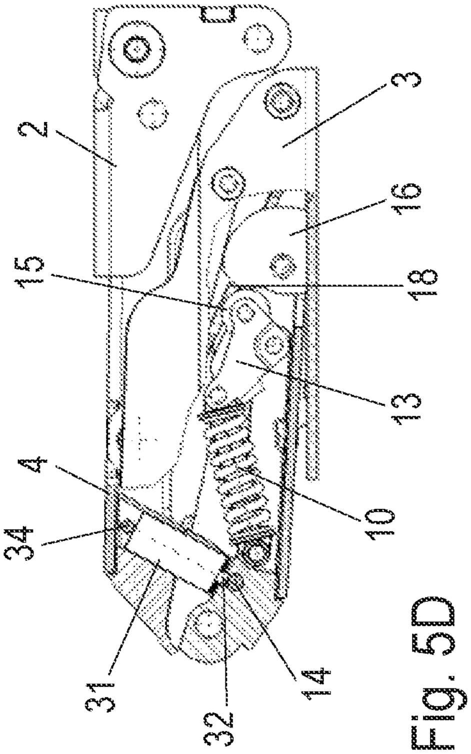
Figure 5C:
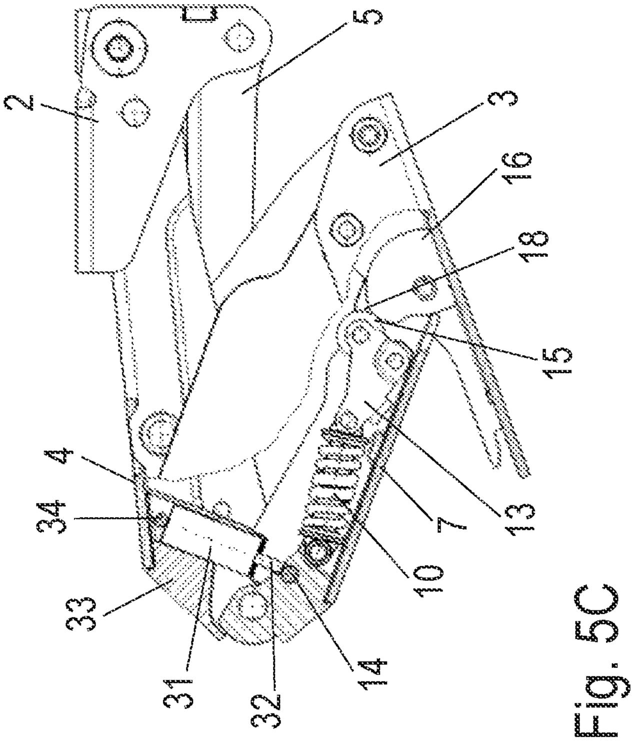
Figure 6B:
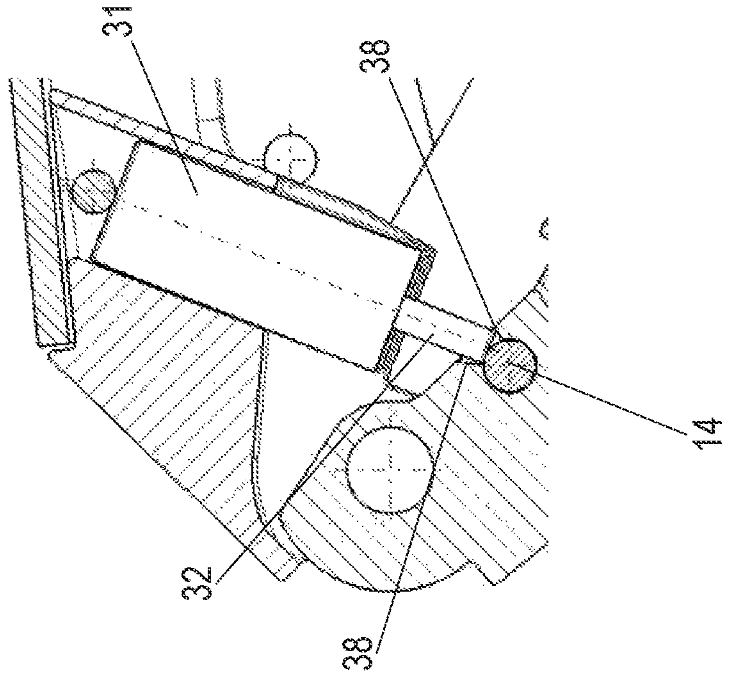
Figure 6A:
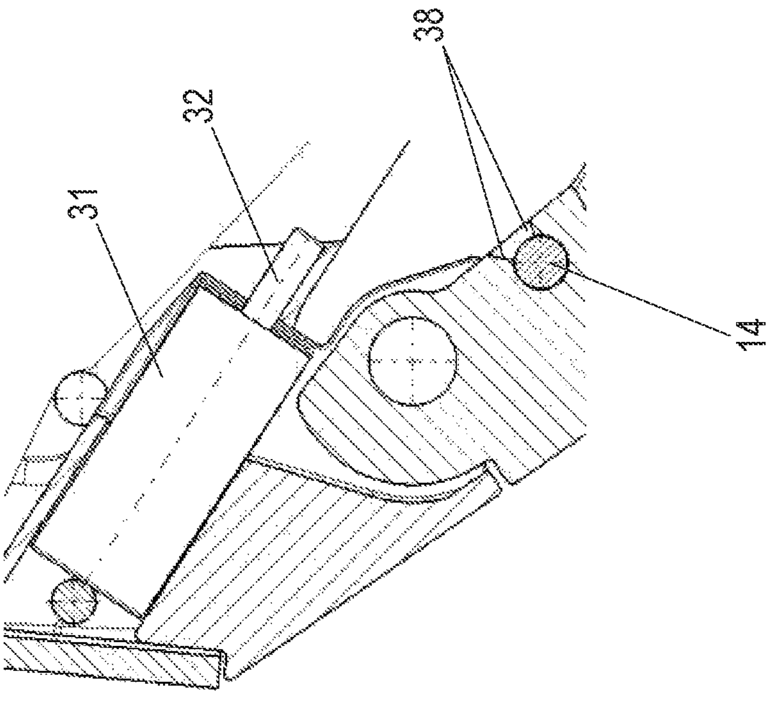

The invention is explained in more detail below by means of an example of an embodiment with reference to the accompanying drawings. It is shown in:

FIGS. 1A and 1B Two views of the multi-joint hinge in a closed position;

FIG. 2 An exploded view of the multi-joint hinge of FIG. 1;

FIGS. 3A to 3D Several views of the multi-joint hinge in different positions;

FIGS. 4A and 4B Two sectional views through the multi-joint hinge of FIG. 1;

FIGS. 5A to 5D Several sectional views of the multi-joint hinge in different positions, and FIGS. 6A and 6B Two sectional views of the damping in different positions.

A multi-joint hinge 1 comprises a mounting element 2 which can be fixed to a body of a piece of furniture or a household appliance, for example a refrigerator. A hinge part 3 is held pivotably on the mounting element 2 via a joint mechanism. FIGS. 1A and 1B show a closed position in which the multi-joint hinge 1 is arranged in a box-like manner in a folded position.

FIG. 2 shows an exploded view of the multi-joint hinge 1. The joint mechanism comprises four levers 4, 5, 6 and 7 which create a connection between the mounting element 2 and the hinge part 3.

The mounting element 2 comprises a first axis A1, to which a first lever 4 is hinged. In addition to the first axis A1, the first lever 4 has a second axis A2 and a fifth axis A5. A second lever 5 is hinged to the mounting element 2 on a third axis A3, which has a fourth axis A4 at the opposite end, which is hinged to a third lever 6. The third lever 6 has the fourth axis A4 in a central area and is connected to the first lever 4 at one end via the axis A2. On the opposite side, the third lever 6 is connected to the hinge part 3 at the sixth axis A6. The hinge part 3 is hinged with a seventh axis A7 to the fourth lever 7, which is hinged at the opposite end with the fifth axis A5 to the first lever 4. All levers 4, 5, 6 and 7 are made of bent sheet steel as U-shaped parts in cross-section.

The mounting element 2 has a height adjustment. For this purpose, an axis A8 is formed by a screw 20 which has a threaded section 21. An internally threaded insert 22 is mounted on the threaded section 21, which is arranged on a holder 24 in a rotationally fixed manner. For this purpose, two projections 23 are formed as end stops on the internally threaded insert 22. By turning the screw 20, the screw 20 and thus the mounting element 2 is axially displaced relative to the internally threaded insert 22. The internally threaded insert 22 is thereby fixed in the axial direction to the holder 24, which is fixed to a body via fastening means, such as screws, via the opening 26. By turning the screw 20, the height of the mounting element 2 can thus be adjusted relative to the holder 24.

The articulation mechanism of the multi-joint hinge 1 comprises a spring 10 held between a first guide element 11 and a second guide element 12. The first guide element 11 is articulated to an axis A11 and the second guide element 12 is articulated to a guide lever 13. The guide lever 13 is articulated to the fourth lever 7 and carries a guide roller 15 which is movable along a curve guide 18 on a guide element 16. The guide element 16 is fixed to the fourth lever 7 via an opening 17 with an axis.

The fourth lever 7 comprises an insertion element 9 which can be pivoted together with the fourth lever 7 about the fifth axis A5. The insertion element 9 is fixed to the fourth lever 7 via a further axis A13. The fourth lever 7 and the insertion element 9 thus form a unit that can be moved together, whereby the insertion element 9 can optionally also be formed integrally with the fourth lever 7.

An axis A14 is formed on the insertion element 9, into which an actuating element 14 in the form of a pin is inserted. In the assembled position, the actuating element 14 can act on the front ends of piston rods 32, which can then be pushed into damper housing 31.

The multi-joint hinge 1 comprises two linear dampers 30, each with a damper housing 31 and a piston rod 32. It is also possible that only one linear damper 30 is provided. The linear damper or dampers 30 are arranged within a U-shaped lever 4. The linear damper(s) 30 are at least partially covered laterally by the legs of the U-shaped lever 4. The linear damper(s) 30 are fixed to a holding element 33, which has two adjacent receptacles 35, into each of which a part of a damper housing 31 is inserted. The insertion depth of the damper housing 31 is limited by a stop 34. The stop 34 is designed as a stop pin and is inserted into an opening 37 of the holding element 33. The stop 34 is held at opposite ends on the first lever 4, openings 36 being formed for this purpose on the first lever 4 for insertion of one end of the stop 34. The stop 34 may also be held to the first lever 4 by other fastening means. In addition, the stop 34 does not have to pass through the opening 37 on the holding element 33, but can also extend adjacent to the holding element 33.

The holding element 33 is fixed to the fifth axis A5 via an opening and, in the installed position, is supported on and movable together with the first lever 4.

In the illustrated embodiment, the hinge part 3 is L-shaped in cross-section, wherein a mounting part 103 is fixed to the hinge part 3 so that the sixth axis A6 and the seventh axis A7 can run between a wall of the hinge part 3 and the mounting part 103. The mounting part 103 forms a spacer to allow the cover 8 to pivot. In the assembled position, the levers 6 and 7 are arranged inside the U-shaped door bearing consisting of hinge part 3 and mounting part 103.

The multi-joint hinge 1 further comprises covers 8 which, in an open position, cover gaps between the third lever 6 and the fourth lever 7, thereby forming a protection against engagement. The covers 8 can be held in an articulated manner on the stop 34 or another axis and have an elongated hole guide that cooperates with a guide pin fixed to the hinge part 3.

FIGS. 3A to 3D show the multi-joint hinge 1 in different positions. In the folded closed position, the levers 4, 5, 6 and 7 of the joint mechanism are nested inside each other and the multi-joint hinge 1 is box-shaped.

Figure 3B:
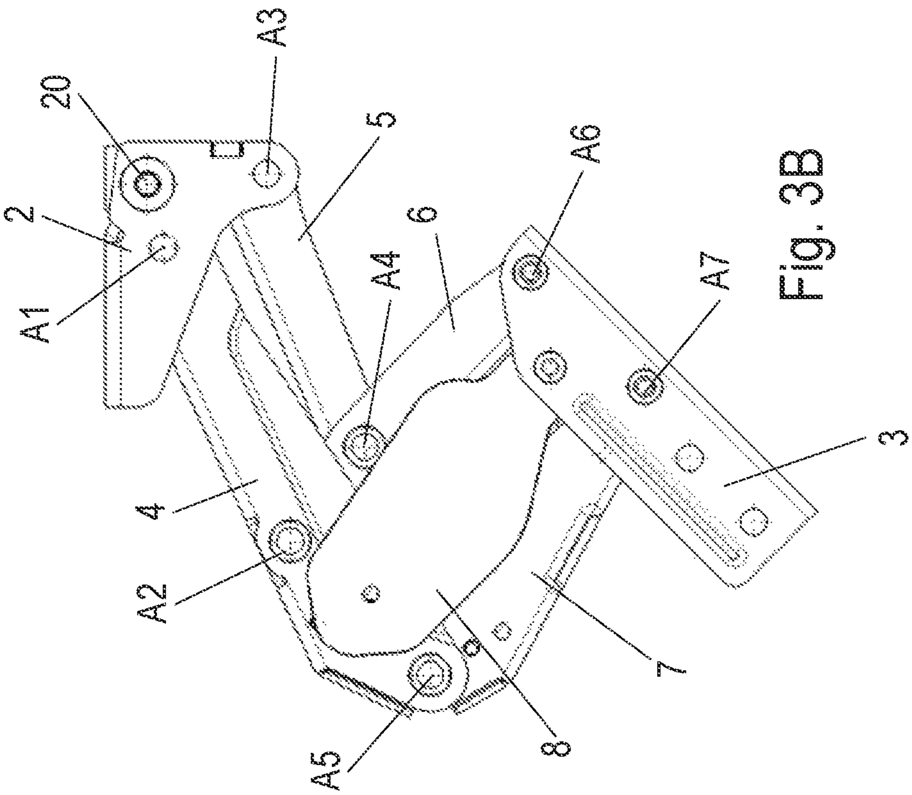
Figure 3A:
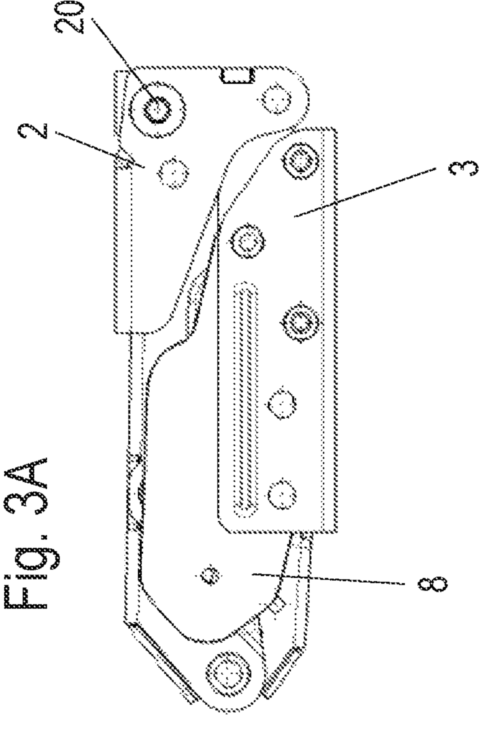
Figure 3D:
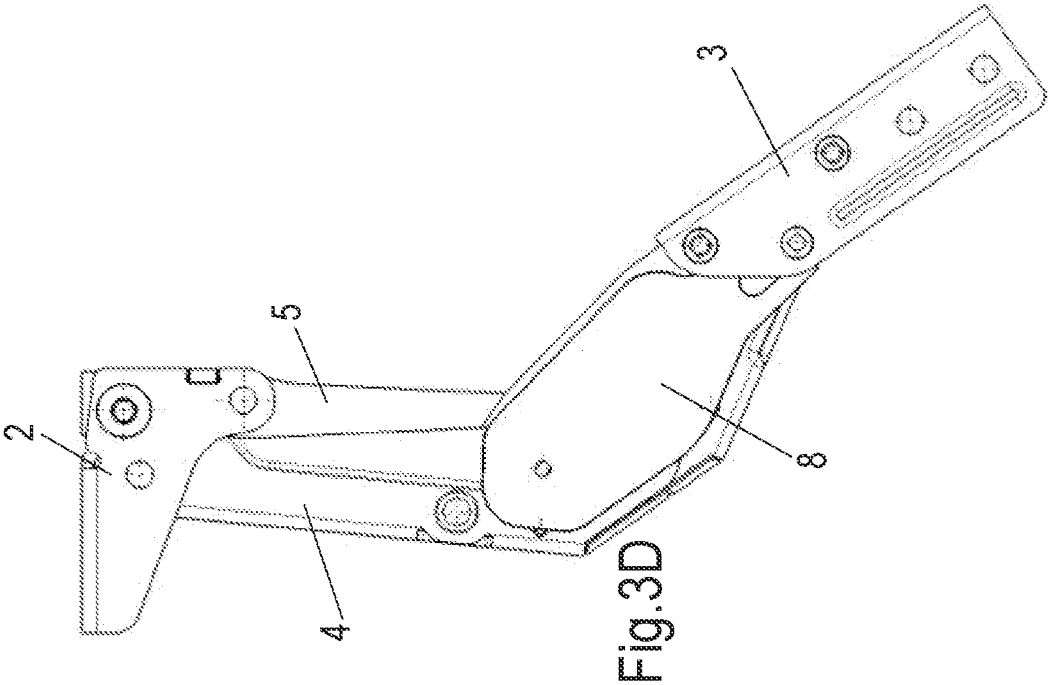
Figure 3C:
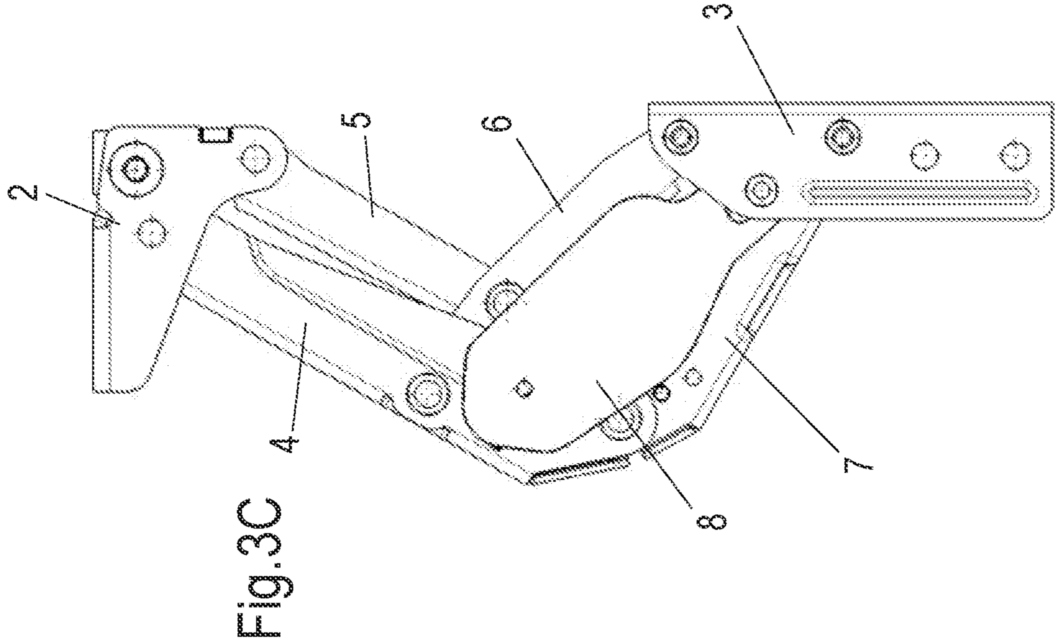

When the hinge part 3 is pivoted relative to the mounting element 2, the joint mechanism unfolds and the levers 4, 5, 6 and 7 pivot towards each other, as shown in FIGS. 3B and 3C. FIG. 3D shows the maximum opening position of hinge part 3, which is for example in a range between 100° to 150° away from the closing position. The opening angle can be determined from two parallel surfaces of the mounting element 2 and the hinge part 3 in the closed position.

FIGS. 4A and 4B show a sectional view of the multi-joint hinge 1. Each linear damper 30 is inserted into the holding element 33 with a damper housing 31, whereby a front end of the damper housing 31 is supported on the stop 34, which is held between two walls of the first lever 4. The stop 34, which is designed as a stop pin, can be made of metal and can absorb high compressive forces.

On the opposite side, the piston rod 32 rests with an end face against the actuating element 14, which is designed as a pin, in particular as a cylindrical pin. The actuating element 14 can also be made of metal in order to be able to transmit high pressure forces.

The spring 10 is hinged to the insertion element 9 between the first guide element 11 on an axis A11. The guide element 11 projects into the spring 10 with a pin, and the second guide element 12 also has a pin for guiding the spring 10. The pins provide centring within the lever 7. The insertion element 9 serves to centre the guide element 11 within the lever 7, which is preferably movable without dragging. The second guide element 12 is hingedly connected to the guide lever 13, which is hingedly held centred on the insertion element 9 about the axis A13. The guide lever 13 is used to move a guide roller 15, which rolls along a curve guide 18. The curve guide 18 is formed on the guide element 16, which is held non-rotatably on the hinge part 3.

As shown in FIG. 4B, two linear dampers are arranged side by side on the holding element 33, both of which are supported by a single stop 34 and whose piston rods 32 can both be moved by an actuating element 14. The longitudinal axes of the actuating element 14 and the stop 34 extend perpendicular to the longitudinal axes of the linear dampers.

FIG. 5A shows the multi-joint hinge in a maximum open position. It can be seen that the spring 10 is arranged in a compacted, compressed position and the guide roller 15 has been moved along the curve guide 18. The linear damper 30 is arranged on the holding element 33, and the piston rod 32 of each linear damper is arranged in a free-standing manner without contact with another component. The multi-joint hinge is in a freewheel position. In the freewheel position, the linear damper 30 is not effective.

When the multi-joint hinge is moved in the closing direction, as shown in FIG. 5B, the guide roller 15 moves along the curve guide 18. Up to an angle of about 30° before the closing position, for example between 20° to 40° before the closing position, the spring 10 remains in the compressed position, as the first guide element 11 and the second guide element 12 do not move or move only slightly relative to each other. When the hinge part 3 reaches the angular position where the contraction range begins, the guide roller 15 is moved on the curve guide 18 in such a way that the guide lever 13 pivots so that the second guide element 12 moves away from the first guide element 11. This allows the spring 10, which is compressed to pressure, to release and thus the closing process is supported. At the beginning of the contraction range, one end face of the piston rod 32 is still at a distance from the actuating element 14, since the linear damper 30 only becomes effective later during a closing movement.

FIG. 5C shows the position of the hinge part 3 in which the actuating element 14 begins to push the piston rod 32 into the damper housing 31. The damper housing 31 is supported by the stop 34 so that a closing movement of the hinge part 3 can be braked. At the same time, the spring 10 ensures that the hinge part 3 is pretensioned in the closing direction by moving the guide roller 15 along the curve guide 18.

FIG. 5D shows the closed position in which the spring 10 was released by moving the guide roller 15 along the curve guide 18. At the same time, the piston rod 32 was pressed into the damper housing 31, which braked the movement of the hinge part 3.

FIGS. 6A and 6B show an enlarged view of the linear damper 30. In FIG. 6A, the linear damper 30 is in a freewheeling position and does not touch the actuating element 14. The actuating element 14 has a curved surface. This curved surface is enclosed by an inlet guide 38. The inlet guide 38 is funnel-shaped. The inlet guide 38 serves as a guide for the piston rod 32. FIG. 6B shows the moment at which the piston rod 32 directly meets the actuating element 14. It can be seen that the inlet guide 38 only allows a minimal lateral play for the piston rod 32, whereby unwanted transverse forces that could act on the piston rod 32 are prevented. As the hinge continues to close, the piston rod 32 slides on the actuating element 14 as the angle of the levers 4 and 7 changes continuously. The damper 30 thus performs a partial orbit around the actuating element 14. The inlet guide 38 is shaped, among other things, so that the piston rod 32 is not pushed laterally away from the inlet guide 38 during the partial orbit around the actuating element 14.

In the embodiment shown, the two linear dampers 30 are mounted between the first lever 4 and the fourth lever 7. It is of course also possible to provide the linear dampers between two other levers 4, 5, 6 and 7 or on the mounting element 2 designed as a lever or the hinge part 3. Also, the spring 10 with the guide lever 13 can be mounted at another position of the multi-joint hinge instead of between the fourth lever 7 and the hinge part 3.

In the embodiment shown, the linear dampers 30 and the actuating element 14 are not adjustable. However, it is also possible that the linear dampers 30 are arranged on an adjustable carriage on the holding element 33. In this case, an eccentric or a worm wheel can be provided as an adjustment means. The linear dampers 30 can be adjusted from outside the lever 4.

Alternatively, it is also possible that the actuating element 14 is adjustably mounted. For this purpose, for example, a threaded device can be provided on the actuating element 14 so that the actuating element can be displaced in depth. If the actuating element is designed as a pin 14, the pin can be guided laterally in a guide on the lever 7. It is essential here that the actuating element 14 is adjustable relative to the linear damper 30, so that a contact point between the at least one piston rod 32 and the actuating element 14 is adjustable depending on the angular position of the hinge part 3.

LIST OF REFERENCE SIGNS

1 Multi-joint hinge
2 Mounting element
3 Hinge part
4 Levers
5 Lever
6 Lever
7 Lever
8 Cover
9 Insertion element
10 Spring
11 Guide element
12 Guide element
13 Guide lever
14 Actuating element
15 Guide roller
16 Guide element
17 Opening
18 Curve guide
20 Screw
21 Thread section
22 Internally threaded insert
23 Projection
24 Holder
25 Receptable
26 Opening
30 Linear damper
31 Damper housing
32 Piston rod
33 Holding element
34 Stop
35 Receptable
36 Opening
37 Opening
38 Inlet guide
103 Mounting part
A1 Axis
A2 Axis
A4 Axis
A5 Axis
A6 Axis
A7 Axis
A11 Axis
A13 Axis
A14 Axis

The invention claimed is:

1. A multi-joint hinge (1) for a refrigerator, comprising a mounting element (2) configured to be fixed to an appliance body and a hinge part (3) which is configured to be fixed to a door and is held pivotably on the mounting element (2) between a closed position and a maximum open position via a joint mechanism having a plurality of joint levers (4, 5, 6, 7), wherein the hinge part (3) is biased in a closing direction in a contraction range via a spring (10) and at least one linear damper (30) with a damper housing (31) and a piston rod (32) displaceable relative to the damper housing (31) is provided, which brake a closing movement of the hinge part (3) before the closing position is reached, wherein the at least one linear damper (30) is arranged with the damper housing (31) in a rotationally fixed manner via a holding element (33) within a first one of the levers of the joint mechanism, wherein the holding element (33) is fixed to the first lever (4) of the joint mechanism, wherein and the piston rod (32) is configured to be pushed into the damper housing (31) via an actuating element (14) that pushes the piston rod (32), the actuating element (14) being arranged on a further lever (7) of the joint mechanism, wherein in the closed position, the levers (4, 5, 6, 7) of the joint mechanism are nested inside each other and the multi-joint hinge (1) is box-shaped.

2. The multi-joint hinge according to claim 1, wherein the first lever (4) is U-shaped in cross-section and the damper housing (31) of the at least one linear damper (30) is arranged between the two legs of the first lever (4).

3. The multi-joint hinge according to claim 1, wherein the actuating element (14) has a curved contact surface arranged between two walls of the further lever (7).

4. The multi-joint hinge according to claim 3, wherein the piston rod (32) slides with one end face indirectly or directly on the contact surface of the actuating element (14) at least during a closing movement of the hinge.

5. The multi-joint hinge according to claim 1, wherein the holding element (33) is fixed on a joint axis (A5) between the first lever (4) and the further lever (7).

6. The multi-joint hinge according to claim 1, wherein the holding element (33) is supported with a stop on a wall of the first lever (4).

7. The multi-joint hinge according to claim 1, wherein the holding element (33) comprises at least one receptacle (35) for the damper housing (31), the receptacle (35) limiting a movement of a damper housing (31) when the piston rod (32) is pushed in.

8. The multi-joint hinge according to claim 7, wherein a stop (34) for the damper housing (31) is formed on the receptacle (35).

9. The multi-joint hinge according to claim 1, wherein the contraction range of the spring (10) between the closed position of the hinge part (3) and an open position of the hinge part (3) is provided between 20° to 40°.

10. The multi-joint hinge according to claim 1, wherein an effective range of the at least one linear damper (30) in relation to the pivoting range of the hinge part (3) is smaller than the contraction range of the spring (10).

11. The multi-joint hinge according to claim 1, wherein said at least one linear damper (30) is effective in an opening position of the hinge part (3) between 10° to 25° and the closing position.

12. The multi-joint hinge according to claim 1, wherein said at least one linear damper (30) comprises a spring element biasing the piston rod (32) into a projecting position.

13. The multi-joint hinge according to claim 1, wherein the multi-joint hinge (1) is designed as a seven-joint hinge with four levers (4, 5, 6, 7) which are configured to be pivoted relative to one another and together form seven joints (A1 to A7).

14. The multi-joint hinge according to claim 1, wherein at least two linear dampers (30) are provided, wherein the actuating element is configured to push the piston rods (32) together into the damper housing (32) at least in a partial region between the closed position of the hinge part (3) and an open position of the hinge part (3).

15. The multi-joint hinge according to claim 1, wherein the actuating element (14) on the further lever (7) acts on the at least one piston rod (32) in a damping range when the hinge part is pivoted and is freely movable in a range outside the damping range, the actuating element (14) being arranged in the range of free movement at a distance from the at least one piston rod (32) and thus the at least one piston rod (32) being arranged without contact with the actuating element (14).

16. The multi-joint hinge according to claim 1, wherein the actuating element (14) comprises an inlet guide (38) for the at least one piston rod (32).

17. The multi-joint hinge according to claim 16, wherein the inlet guide (38) is funnel-shaped.

18. The multi-joint hinge according to claim 16, wherein the inlet guide (38) for the at least one piston rod (32) is arranged with lateral play around the piston rod (32).

19. The multi-joint hinge according to claim 1, wherein the actuating element (14) is adjustable relative to the linear damper (30) so that a contact point between the at least one piston rod (32) and the actuating element (14) is adjustable in dependence on the angular position of the hinge part (3).

20. A refrigerator comprising an appliance body and a door pivotably mounted on the appliance body and held on the appliance body by at least one multi-joint hinge according to claim 1.

* * * * *